(12) United States Patent   (10) Patent No.: US 8,746,734 B1
Smith et al.   (45) Date of Patent: Jun. 10, 2014

(54) CURTAIN AIRBAGS WITH ISOLATED CHAMBERS AND CONSTRUCTION METHODS

(71) Applicant: Autoliv ASP, Inc., Ogden, UT (US)

(72) Inventors: Bradley W. Smith, Plain City, UT (US); Francois Peremarty, Quimper (FR)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/770,883

(22) Filed: Feb. 19, 2013

(51) Int. Cl.
*B60R 21/232* (2011.01)
*B60R 21/2338* (2011.01)
*B60R 21/239* (2006.01)

(52) U.S. Cl.
CPC ........... *B60R 21/232* (2013.01); *B60R 21/2338* (2013.01); *B60R 21/239* (2013.01); *B60R 2021/23382* (2013.01)
USPC ..................... 280/730.2; 280/729; 280/743.1; 280/743.2

(58) Field of Classification Search
CPC ..................... B60R 21/2338; B60R 21/23138; B60R 21/23184; B60R 21/2334; B60R 21/232; B60R 21/213; B60R 21/23382
USPC .......................... 280/730.2, 743.1, 743.2, 729
See application file for complete search history.

(56) References Cited

U.S. PATENT DOCUMENTS

| | | | |
|---|---|---|---|
| 5,458,366 A * | 10/1995 | Hock et al. | 280/729 |
| 6,213,499 B1 * | 4/2001 | Khoudari et al. | 280/730.2 |
| 6,402,190 B1 | 6/2002 | Heudorfer et al. | |
| 6,631,921 B1 | 10/2003 | Drossler et al. | |
| 6,926,792 B1 * | 8/2005 | Valkenburg et al. | 156/287 |
| 7,163,233 B2 * | 1/2007 | Kino | 280/730.2 |
| 7,168,735 B2 * | 1/2007 | Kino et al. | 280/730.2 |
| 7,264,269 B2 * | 9/2007 | Gu et al. | 280/730.2 |
| 8,286,747 B2 * | 10/2012 | Kim | 180/274 |
| 2001/0026062 A1 * | 10/2001 | Kosugi et al. | 280/730.2 |
| 2004/0140657 A1 * | 7/2004 | Kuppurathanam | 280/743.1 |
| 2005/0161917 A1 * | 7/2005 | Stevens | 280/730.2 |
| 2007/0001433 A1 * | 1/2007 | Gu et al. | 280/729 |
| 2009/0218798 A1 | 9/2009 | Garner | |
| 2009/0322062 A1 * | 12/2009 | Bauer et al. | 280/729 |
| 2012/0200069 A1 * | 8/2012 | Kato et al. | 280/730.2 |
| 2013/0291956 A1 * | 11/2013 | Zhang et al. | 137/224 |
| 2013/0292289 A1 * | 11/2013 | Zhang et al. | 206/522 |

FOREIGN PATENT DOCUMENTS

GB   2350332 A   * 11/2000

* cited by examiner

*Primary Examiner* — James English
(74) *Attorney, Agent, or Firm* — Stoel Rives LLP

(57) ABSTRACT

An inflatable curtain airbag, or airbag assembly, can include a plurality of inflatable cushion segments that are able to selectively fluidly communicate with an inflation gas delivery channel. The inflatable curtain airbag, or airbag assembly, can further include a valving panel that has a separate valving portion associated with each inflatable cushion segment. Each valving portion can allow fluid communication between the inflatable cushion segment and the inflation gas delivery channel when in an open configuration and can prevent fluid communication between the inflatable cushion segment and the inflation gas delivery channel when in a closed configuration.

29 Claims, 15 Drawing Sheets

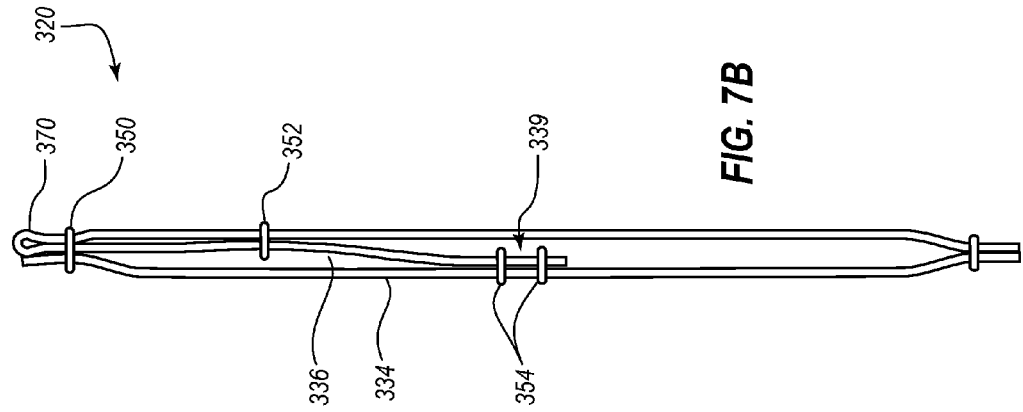
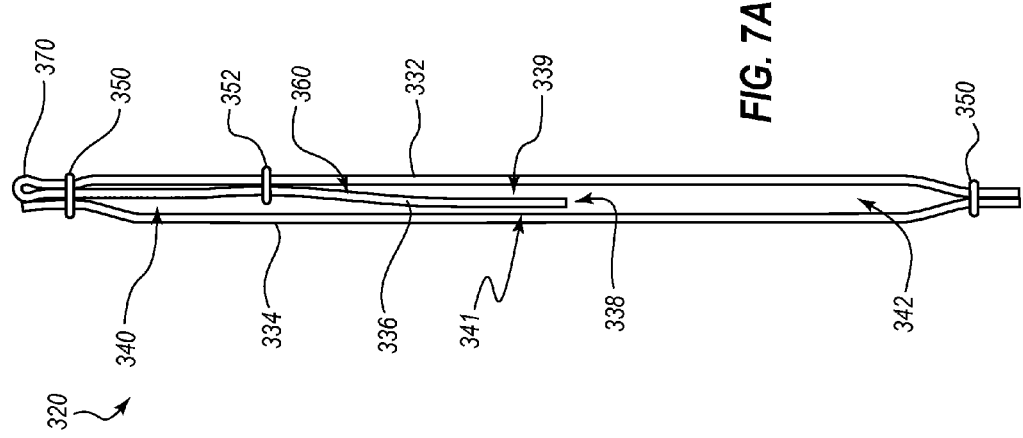

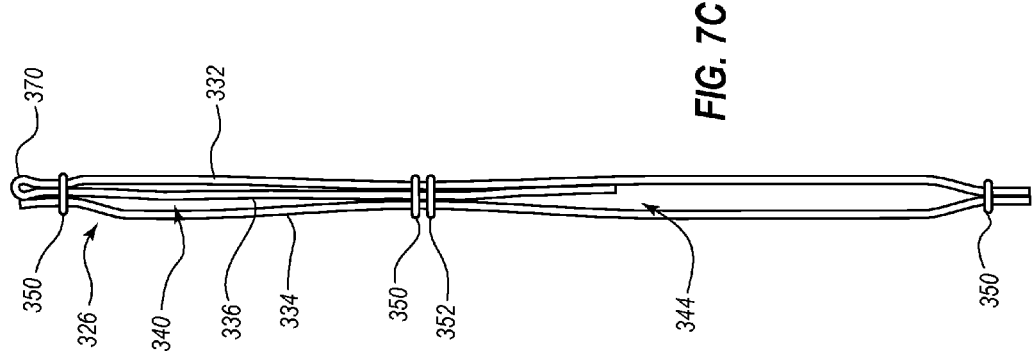

CURTAIN AIRBAGS WITH ISOLATED CHAMBERS AND CONSTRUCTION METHODS

BACKGROUND

Inflatable curtain airbags are often mounted in a roof region of a vehicle, such as, for example, to a roof rail of the vehicle. Some curtain airbags have multiple chambers that may be inflated to different pressures. In some instances, the curtain airbags can suffer from one or more drawbacks and/or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 7A is a cross-sectional view of the airbag of FIGS. 6A and 6B taken along the view line 7A-7A in FIGS. 6A and 6B, wherein the airbag is an a non-inflated state;

FIG. 7B is a cross-sectional view of the airbag of FIGS. 6A and 6B taken along the view line 7B-7B in FIGS. 6A and 6B, wherein the airbag is in a non-inflated state;

FIG. 7C is a cross-sectional view of the airbag of FIGS. 6A and 6B taken along the view line 7C-7C in FIGS. 6A and 6B, wherein the airbag is in a non-inflated state.

DETAILED DESCRIPTION

Figure 1A:
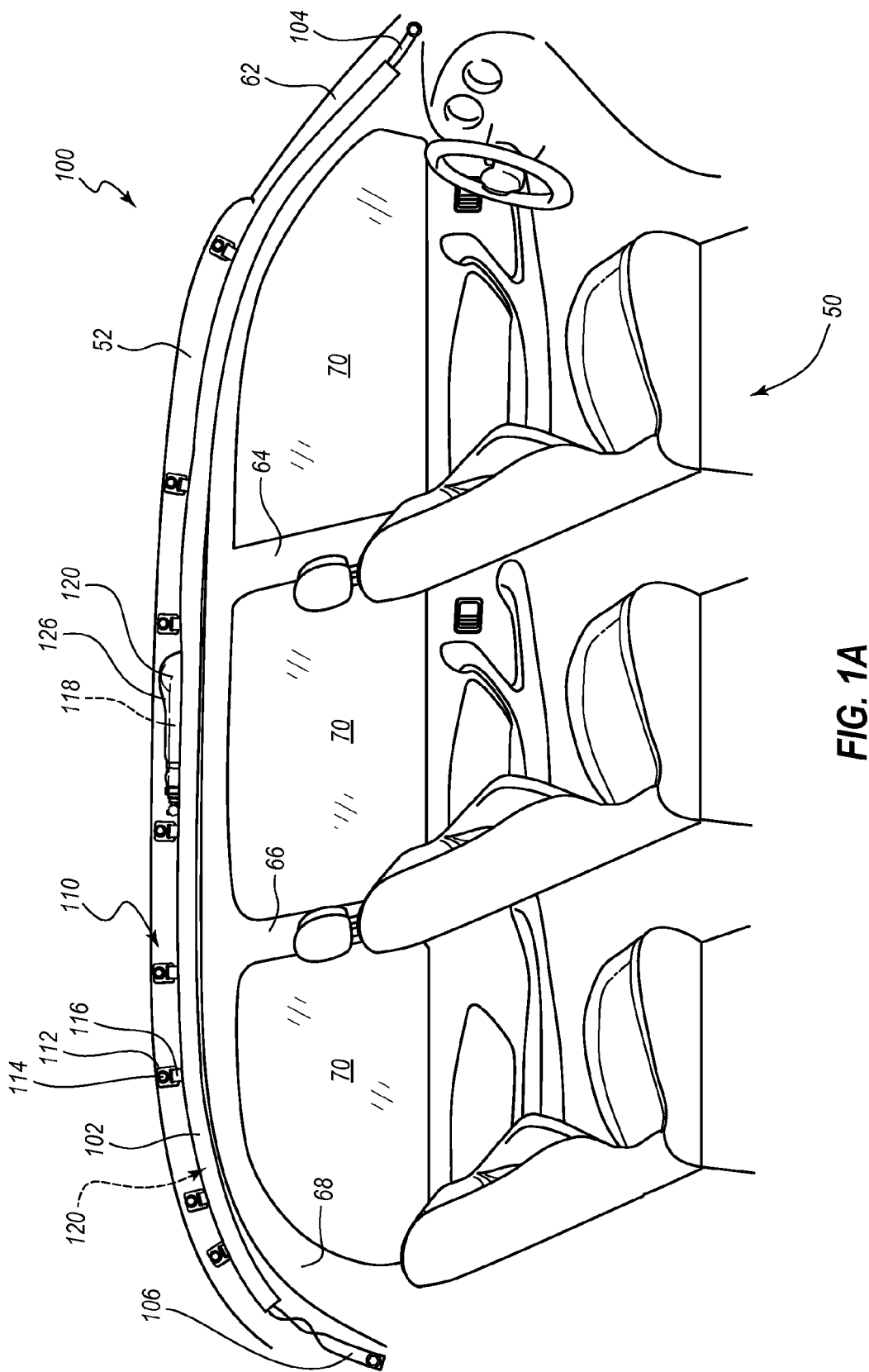
FIG. 1A is an elevation view of an embodiment of an inflatable curtain airbag assembly mounted within a vehicle, wherein the assembly is shown in a packaged configuration.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" generally refers to an inflatable curtain airbag or cushion, although the principles discussed may apply to other airbag types in other embodiments.

Inflatable curtain airbags typically extend longitudinally within the vehicle and are usually coupled to or next to the roof rail of the vehicle. In an undeployed state, inflatable curtain cushions are typically rolled and/or folded, and may be retained in the undeployed configuration by being wrapped in a restraint at various attachment points at which the inflatable airbag is attached to the vehicle, or by being enclosed in a restraint, such as a sleeve or sock. In a deployed state, an inflatable curtain cushion may expand and burst free from the restraint to cover at least a portion of the side windows and one or more pillars of the vehicle. In some embodiments, inflatable curtain cushions may cover one or more of the A-, B-, C-, and D-pillars of a vehicle. For example, in some embodiments, the inflated curtain airbag may extend from the A-pillar to the C-pillar of the vehicle. In other embodiments, a deployed inflatable curtain cushion may extend from the A-pillar to the D-pillar of the vehicle.

In a collision event, the inflatable curtain cushion may be inflated by an inflator and change conformation from being rolled and/or folded in the packaged state to being extended and/or inflated in a deployed state. In some arrangements, the amount of gas from the inflator that is retained within the inflatable curtain determines how hard or soft the cushioning of the curtain will be. Other factors may also affect the cushioning abilities of the inflatable curtain airbag.

Some inflatable curtain cushions may be configured to serve dual functions of cushioning and ejection prevention. During a collision event, the curtain may cushion the head and upper body of an occupant, and during a roll-over event, the cushion may function to help retain the occupant within the vehicle. The two functions can require significantly different time-scales. In certain instances, inflatable curtains are configured to provide cushioning during a side impact event for up to about 500 milliseconds. However, during a roll-over event, the inflatable curtain may need to cushion an occupant and protect against occupant ejection for a much longer period, such as up to about seven seconds. Inflatable curtain cushions help mitigate the risk of occupant ejection by forming a barrier between the occupant and the side windows. Embodiments disclosed herein can be used in airbag cushion arrangements for which different cushioning and/or gas retention properties are desired for different portions of the airbag cushion. For example, in some embodiments, some chambers of an inflatable airbag cushion can be configured to retain inflation gas therein for sustained periods of time, even when the chambers are compressed by contact with a moving occupant during a collision event. Such a chamber may be filled via a one-way valve that permits inflation gases to expand the chamber. The one-way valve may close when a sufficient pressure is reached within the chamber and may thereafter prevent the inflation gas from escaping from the chamber so as to retain the inflation gas within the chamber, even as pressure within the chamber increases due to compression of the chamber due to contact with the vehicle occupant.

Certain embodiments of inflatable curtain airbags disclosed herein can include multiple chambers or cells that may be in fluid communication with one another and/or with a common portion of the inflatable curtain airbag prior to airbag deployment and/or during airbag deployment. Each chamber may be configured to close when a sufficient pressure has been achieved via inflation gases that fill the chamber. A filled chamber thus may be sealed and may be fluidly isolated from the remaining chambers. Thereafter, the chamber may provide effective cushioning of a vehicle occupant by preventing inflation gases from exiting from the chamber to other regions of the inflated airbag cushion. For example, the chamber can be configured to prevent inflation gases from exiting the airbag cushion so as to be redistributed into other chambers of the airbag when a vehicle occupant compresses the chamber during a collision event. One-way valves can be used to permit multiple chambers to be filled with inflation gases and to thereafter be fluidly isolated from one another.

As further discussed below, in some embodiments, a single valving flap or panel can be used to form separate one-way valves for a plurality of inflatable chambers. Such constructions can, in some instances, facilitate manufacture of the airbags and/or reduce material and/or other manufacturing costs. These and/or other features and advantages of various inflatable curtain airbags will be apparent from the discussion that follows.

Figure 1B:
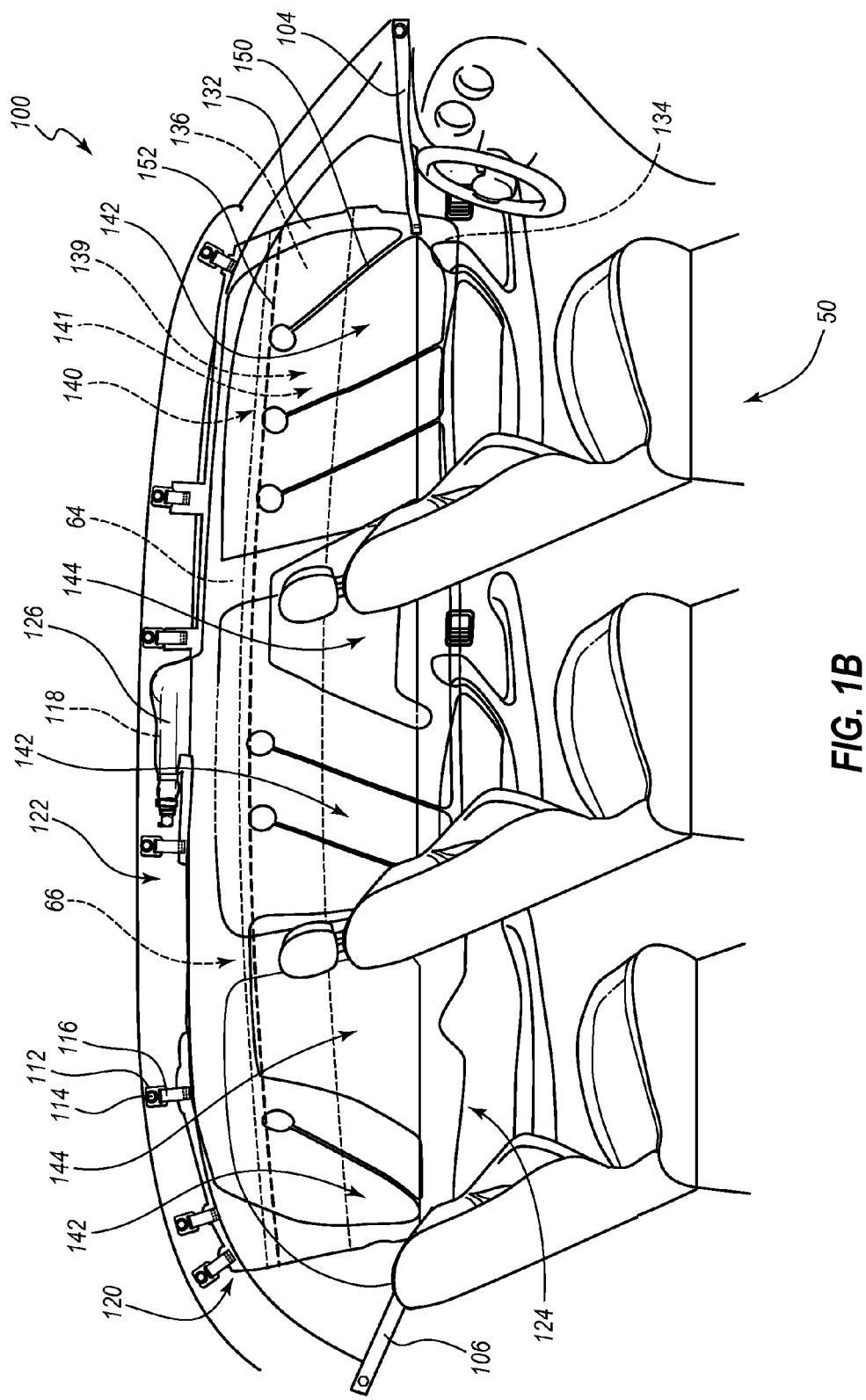
FIG. 1B is another elevation view of the inflatable curtain airbag assembly of FIG. 1A shown in a deployed configuration.

FIGS. 1A and 1B depict an embodiment of an inflatable curtain airbag assembly 100 mounted within a vehicle 50. In FIG. 1A, the assembly 100 is in a packaged configuration, whereas in FIG. 1B, the assembly 100 is in a deployed configuration.

With reference to FIG. 1A, the assembly 100 can include an airbag cushion or inflatable curtain airbag 120 (see also FIG. 1B), which can be secured to the vehicle 50 in any suitable manner. The inflatable curtain airbag 120 may also be referred to herein as a cushion or as an airbag. In the illustrated embodiment, the airbag 120 is positioned at an interior of a restraint 102 so as to be retained in a packaged configuration. The restraint 102 may be of any suitable variety, such as one or more straps, tethers, socks, or sleeves. In the illustrated embodiment, the restraint 102 comprises a sleeve that extends along substantially a full length of the airbag 120, such that a majority of the airbag 120 is obscured from view by the sleeve in FIG. 1A.

The assembly 100 can be attached to the vehicle 50 in any suitable manner. For example, in some embodiments, the assembly 100 includes one or more fastening assemblies 110 that are configured to secure one or more of the airbag 120 and the restraint 102 to the vehicle 50. The assembly 100 can be mounted inside the vehicle 50 adjacent to a roof of the vehicle, such as to a roof rail 52. In the illustrated embodiment, each fastening assembly 110 includes a tether or strap 116 that is secured to mounting hardware, such as a tab 112 that is secured to the roof rail 52 via a fastener 114, such as a bolt. Any other suitable fastening arrangement is contemplated. Each strap 116 may be coupled with one or more of the airbag 120 and the restraint 102 in any suitable manner.

A forward end of the assembly 100 can include a strap 104, which may be secured to the vehicle in any suitable manner. For example, in the illustrated embodiment, the strap 104 is attached to a lower end of an A-pillar 62. Similarly, a rearward end of the assembly 100 can include a strap 106, which may be attached at or adjacent to a lower end of a D-pillar 68. As shown in FIG. 1B, the straps 104, 106 can be attached to a lower end 124 of the airbag 120. An upper end 122 of the airbag 120 can be attached to the straps 116. In some embodiments, the straps 116 are sewn to the airbag 120. In other embodiments, the straps 116 may be integrally formed with the airbag 120, and may extend from one or more panels of the airbag 120.

With continued reference to FIG. 1A, the assembly can further include an inflator 118, which may be positioned within a throat 126 of the airbag 120. The inflator 118 can be anchored to the roof rail 52, and may be of any suitable variety. In some embodiments, the inflator 118 comprises either a pyrotechnic device or a stored gas inflator. The inflator 118 can be in electronic communication with vehicle sensors which are configured to detect vehicle collisions and/or rollovers. Upon detection of predetermined conditions, the sensors can activate the inflator 118 and inflatable curtain cushion 120 rapidly inflated.

With reference to FIGS. 1A and 1B, the airbag 120 can be configured to cover various structures of the vehicle 50 when deployed. For example, in some embodiments, at least a portion of the deployed airbag 120 can cover one or more of the A-pillar 62, a B-pillar 64, a C-pillar 66, and the D-pillar 68, and/or one or more side windows 70. The illustrated embodiment is configured to cover the B- and C-pillars 64, 66 and each of the side windows 70.

With reference to FIG. 1B, the airbag 120 can define various portions that provide different amounts of cushioning relative to the vehicle structures. In particular, the airbag 120 can include various inflatable chambers, cells, or cushion segments 142 that are configured to be filled with inflation gases in order to cushion a vehicle occupant during a collision event. The cushion segments 142 can be configured to deploy at strategic areas at which a vehicle occupant may benefit most from the cushioning. The illustrated embodiment includes three cushion segments 142 at a front position that extend downwardly and forwardly from an inflation gas delivery channel 140, a substantially triangularly shaped cushion segment 142 that extends from a rearward end of a front position to a forward end of an intermediate position, two cushion segments 142 at the intermediate position that extend downwardly and rearwardly from the inflation gas delivery channel 140, and two cushion segments 142 at a rear position that extend downwardly and rearwardly from the inflation gas delivery channel 140. As discussed further below, each cushion segment 142 can be in fluid communication with the inflation gas delivery channel 140 during initial stages of deployment, and each cushion segment 142 can be configured to close at a later stage of deployment so as to be fluidly isolated from the gas delivery channel 140 as well as the remaining cushion segments 142. Accordingly, in some embodiments, inflation gases may be retained within a given cushion segment 142 to maintain the cushion segment 142 in an inflated or filled configuration, even when a vehicle occupant presses against the cushion segment 142. Such an arrangement can allow the cushion segment 142 to provide a desired amount of protection to the vehicle occupant.

In some embodiments, the airbag 120 can include one or more non-inflatable regions 144, one or more of which may be positioned between adjacent cushion segments 142 or at an interior of a cushion segment 142 (e.g., so as to be encompassed by a cushion segment 142). The illustrated embodiment includes a first non-inflatable region 144 that is encompassed by the substantially triangularly shaped cushion segment 142, and further includes a second non-inflatable region 144 between the intermediate and rear groups of cushion segments 142.

In various embodiments, at least a portion of one or more of the cushion segments 142 and the non-inflatable regions can be defined by one or more boundary seams 150. The one or more boundary seams 150 may be formed in any suitable manner. For example, in some embodiments, the one or more boundary seams 150 may comprise one or more of stitches, welds (e.g., radiofrequency welds), and/or adhesives. In other or further embodiments, the boundary seams 150 may be woven portions that are formed via one-piece weaving techniques. As further discussed below, in some embodiments, the boundary seams 150 may join together two or more pieces of fabric, such as a front or inboard cushioning panel 132 and a back or outboard cushioning panel 134. In the illustrated embodiment, a single boundary seam 150 extends along the upper end 122 of the airbag 120, extends downwardly at the front and rear ends of the airbag 120 and extends about a periphery of each of the cushion segments 142. Another boundary seam 150 defines the first non-inflatable region 144 at the interior of the triangularly shaped cushion segment 142. In some embodiments, the one or more boundary seams 150 are substantially airtight so as to be able to retain inflation gas within a given cushion segment 142. The one or more boundary seams 150 can be said to fluidly isolate adjacent cushion segments 142 from each other. In other embodiments, the one or more boundary seams 150 may not be airtight, but may instead resist egress of gases from a cushion segment 142.

In certain embodiments, the airbag 120 includes a valving panel 136, which can be positioned between the inboard and outboard cushioning panels 132, 134. The valving panel 136 can include a plurality of valving portions or valving regions 139 that are associated with each of the cushion segments 142. For example, each valving region 139 can define at least a portion of one of the cushion segments 142, as will become more apparent from further discussion of other embodiments below. In the illustrated embodiment, the valving panel 136 extends along a full longitudinal length of the airbag 120 and is coextensive, in the longitudinal direction, with each of the inboard and outboard panels 132, 134. Front and rear ends of the valving panel 136 are captured by the continuous boundary seam 150, and intermediate portions of the valving panel 136 are captured by intermediate portions of the boundary seam 150. The valving regions 139 of the valving panel 136 can be configured as one-way valves 141 that permit inflation gas to move from the inflation gas delivery channel 140 into an cushion segment 142, and once a threshold pressure is achieved within the cushion segment 142, the one-way valve 141 can automatically close so as to fluidly isolate the cushion segment 142 from the inflation gas delivery channel 140. Upon closure of the valving region 139, or one-way valve 141, the cushion segment 142 may be fluidly isolated from the remainder of the airbag 120, such as the remaining cushion segments 142. Functioning of the one-way valves 141 will be more readily apparent from further discussion of other embodiments below.

In the illustrated embodiment, the valving panel 136 is secured to the inboard panel 132 via a barrier seam 152, which may extend in the longitudinal direction. In the illustrated embodiment, the barrier seam 152 extends from the front end to the rear end of the panel 120 along a proximal end of each of the cushion segments 142. As used herein, the terms proximal and distal refer to proximity to the inflator 118 and/or direction of inflation gas flow during deployment, where more proximally oriented features are closer to the inflator and/or contact inflation gases sooner than do more distally oriented features.

In some embodiments, the barrier seam 152 is substantially airtight so as to prevent inflation gases from passing through it. Stated otherwise, the barrier seam 152 can be configured to maintain inflation gases within the various cushioning segments 142 and can assist in fluidly isolating the cushioning segments 142 from each other. In the illustrated embodiment, the barrier seam 152 intersects the boundary seam 150 at the proximal end of each cushioning segment 142. The barrier seam 152 thus can cooperate with the boundary seam 150 to define the boundaries or limits of each segment 142. Inflation gases may be permitted to enter each cushioning segment 142 at the valving regions 139 of the valving panel, which may function as one-way valves, and once the one-way valves have closed, the seams 150, 152 and the one-way valves can maintain the inflation gases within cushioning segments 142. Each cushioning segment 142 can be fluidly isolated from the remaining cushioning segments 142, and thus may operate independently of each other. The foregoing discussion may be more readily understood in view of the discussion of further embodiments below.

The shapes of the airbag 120 and its various components, such as the segments 142, that are depicted in FIG. 1B are not necessarily limiting. These shapes may be altered, such as to accommodate differently shaped vehicles. In some embodiments, the inflated airbag 120 is configured to fit within the side window wells of vehicle 50. The airbag 120 may comprise a contiguous piece of material manufactured using a one-piece woven technique, in some embodiments, or in other or further embodiments, may be manufactured by cutting and sewing separate pieces of material (e.g., nylon fabric) together. For example, two or more of the inboard and outboard cushioning panels 132, 134 and the valving panel 136 may be formed from separate sheets of material that are joined together. In other embodiments, such as discussed below, two or more of the cushioning panels 132, 134 and the valving panel 136 may be formed from a unitary piece of material. In some embodiments, all three panels 132, 134, 136 can be formed from a unitary piece of material that is folded and seamed. In some embodiments, the same material may be used for the valving panel 136 and one or more of the cushioning panels 132, 134. Accordingly, in some embodiments, the valving panel 136 may be no stiffer than one or more of the cushioning panels 132, 134.

As can be appreciated from FIGS. 1A and 1B, when the airbag 120 is in the packaged configuration, all components of the airbag 120 can be at an interior of the restraint 102. In the illustrated embodiment, the restraint 102 is a sleeve that covers an entirety of the airbag 120. However, in other embodiments, the restraint 102 may merely comprise a plurality of straps, and each strap may encompass a portion of various components of the airbag 120, such as, for example, portions of the inflation gas delivery channel 140 and the valving panel 136.

FIGS. 2A-3C depict another embodiment of an inflatable curtain airbag 220 that can resemble the inflatable curtain airbag 120 described above in certain respects, and that can be compatible with the assembly 100. Accordingly, like features are designated with like reference numerals, with the leading digits incremented to "2." Relevant disclosure set forth above regarding similarly identified features thus may not be repeated hereafter. Moreover, specific features of the airbag 220 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag 220. Any suitable combination of the features and variations of the same described with respect to the airbag 120 can be employed with the airbag 220, and vice versa. This pattern of disclosure applies equally to further embodiments depicted in subsequent figures and described hereafter, wherein the leading digits may be further incremented.

Figure 2A:
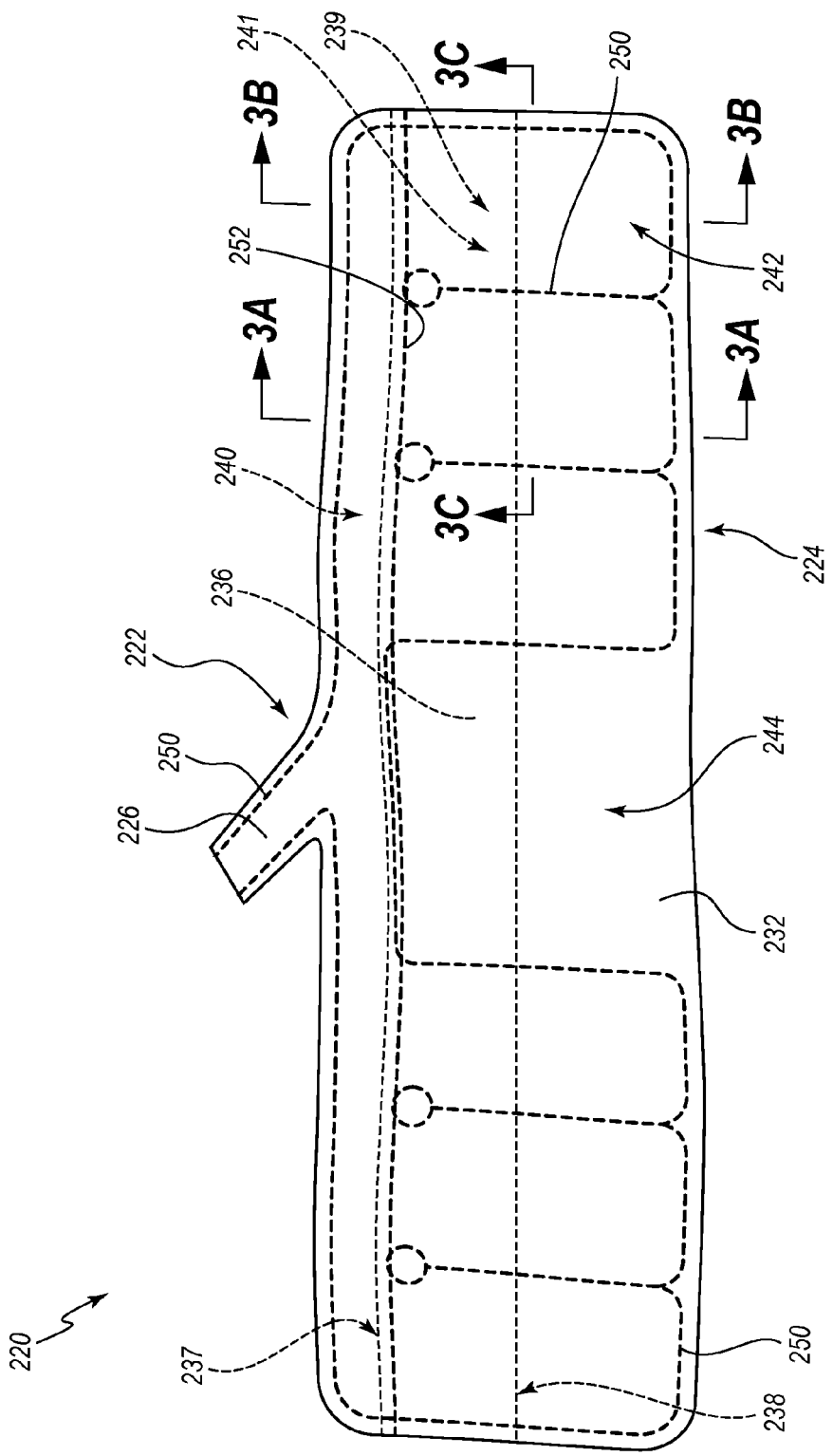
FIG. 2A is an inboard elevation view of an embodiment of an inflatable curtain airbag that is compatible with the inflatable curtain airbag assembly of FIGS. 1A and 1B.
Figure 2B:
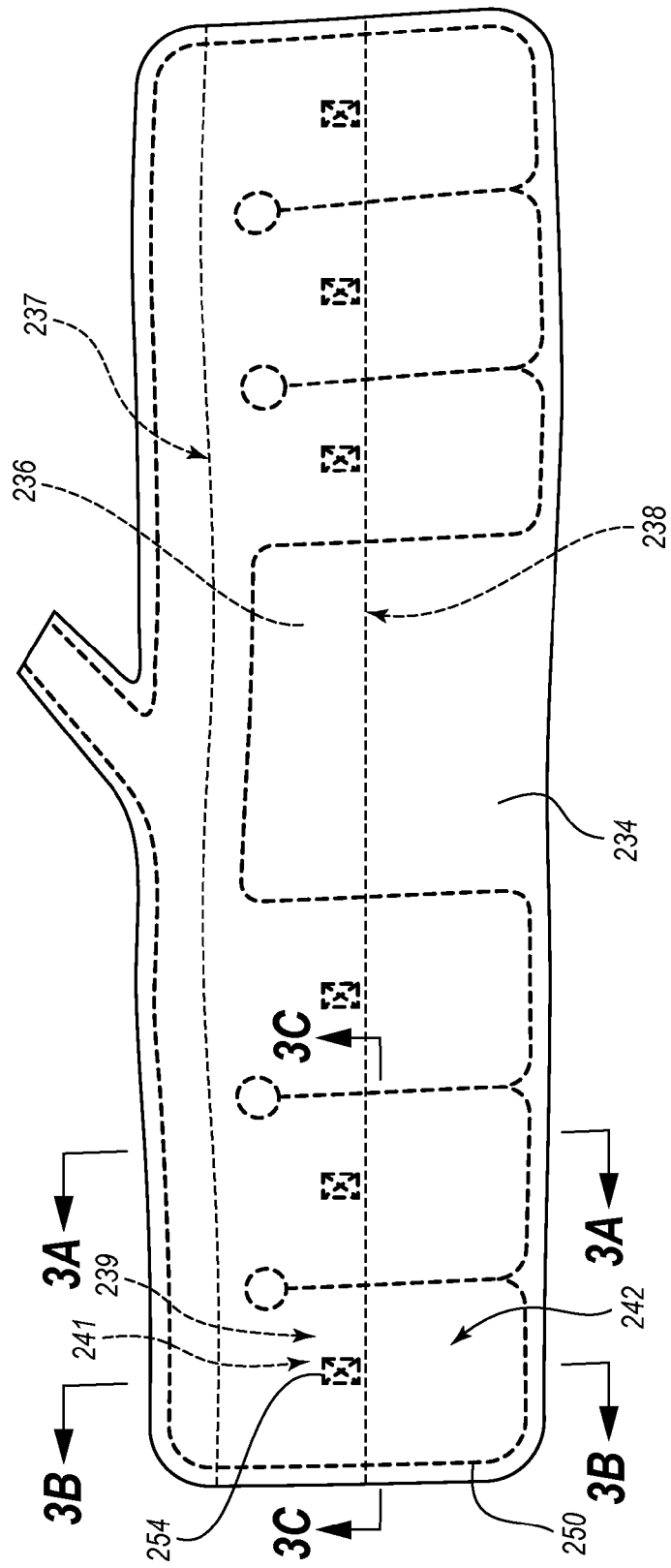
FIG. 2B is an outboard elevation view of the inflatable curtain airbag of FIG. 2A.
Figure 3A:
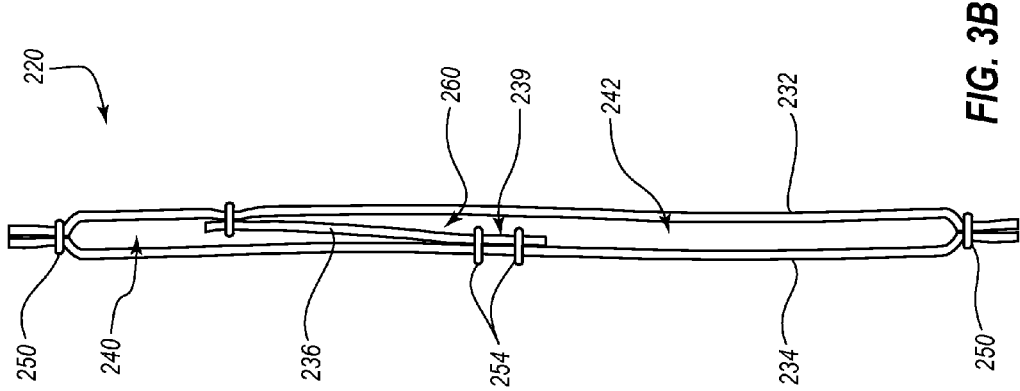
FIG. 3A is a cross-sectional view of the airbag of FIGS. 2A and 2B taken along the view line 3A-3A in FIGS. 2A and 2B, wherein the airbag is an a non-inflated state.
Figure 3B:
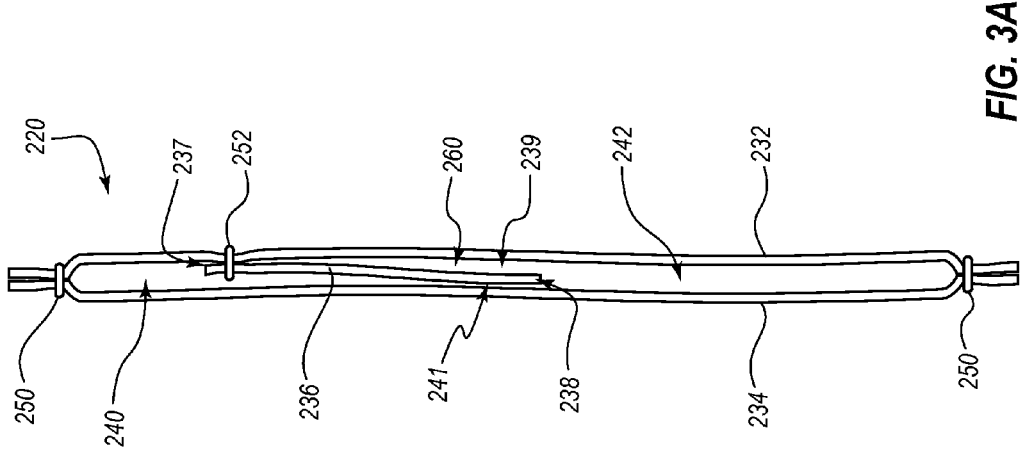
FIG. 3B is a cross-sectional view of the airbag of FIGS. 2A and 2B taken along the view line 3B-3B in FIGS. 2A and 2B, wherein the airbag is in a non-inflated state.
Figure 3C:
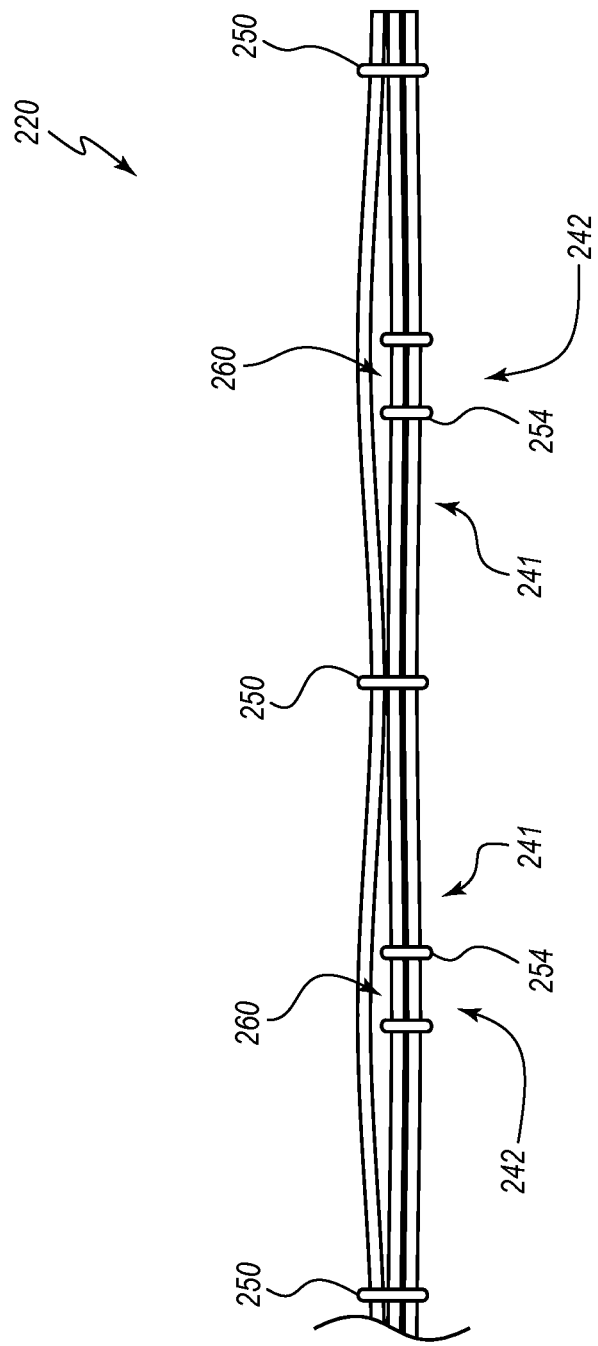
FIG. 3C is a cross-sectional view of the airbag of FIGS. 2A and 2B taken along the view line 3C-3C in FIGS. 2A and 2B, wherein the airbag is in a non-inflated state.

FIGS. 2A and 2B depict an inboard and an outboard elevation view of the airbag 220, respectively, and FIGS. 3A-3C depict various cross-sectional views of the airbag 220. In FIGS. 2A-2B, the airbag 220 is shown in an unfilled state. The airbag 220 may be in such a condition prior to packaging thereof into a packaged state such as that depicted in FIG. 1A, which may be accomplished via folding and/or rolling the unfilled airbag 220.

With simultaneous reference to FIGS. 2A-3C, the airbag 220 can resemble the airbag 120 in many respects. For example, the airbag 220 can include a throat 226 that is configured to receive at least a portion of an inflator 118 therein and/or to be coupled with the inflator 118. The throat 226 is at a proximal end 222 of the airbag 220, and the proximal end 222 can be secured to the vehicle in any suitable manner, such as discussed above. The airbag 220 can be configured to deploy by unfolding and/or unrolling from the proximal end 222 toward a distal end 224.

The throat 226 can be in fluid communication with an inflation gas delivery channel 240, which can be elongated in a longitudinal direction of the airbag 220. In the illustrated embodiment, the inflation gas delivery channel 240 extends from the front end to the rear end of the airbag 220. A plurality of inflatable cushion segments 242 are coupled with the inflation gas delivery channel 240. In particular, each cushion segment 242 is in selective fluid communication with the inflation gas delivery channel 240 via one or more one-way valves 241. The airbag 220 may include one or more non-inflatable regions 244. In the illustrated embodiment, a group of three forwardly positioned cushion segments 242 are separated from a group of three rearwardly positioned cushion segments 242 via a non-inflatable region 244.

In the illustrated embodiment, the airbag 220 comprises three separate pieces of material that are joined together via seams. An inboard cushioning panel 232 is formed of the first piece of material, an outboard cushioning panel 234 is formed of the second piece of material, and a valving panel 236 is formed of the third piece of material. As further discussed below with respect to other embodiments, however, two or more of the panels 232, 234, 236 can be formed of a unitary piece of material. For example, in some embodiments, the panels 232 and 234 are formed of a unitary piece of material, the panels 232 and 236 are formed of a unitary piece of material, or all three of the panels 232, 234, and 236 are formed of a unitary piece of material.

Each of the inboard and outboard cushioning panels 232, 234 can cooperate to define at least a portion of each of the inflatable cushioning segments 242. A single continuous boundary seam 250 can join the cushioning panels 232, 234 to each other about at least a portion of a periphery of the panels 232, 234, and can further define a portion of each of the cushion segments 242. In other embodiments, more than one boundary seam 250 can be used for these purposes.

The valving panel 236 can be positioned between the inboard cushioning panel 232 and the outboard cushioning panel 234. A proximal end 237 of the valving panel 236 can be attached to the inboard cushioning panel 232 via a barrier seam 252. The barrier seam 252 can be of any suitable variety, such as a stitching or welding seam. In the illustrated embodiment, the barrier seam 252 is formed of stitching. The barrier seam 252 can extend along a full longitudinal length of the airbag 220. In the illustrated embodiment, the barrier seam 252 spans a proximal end of each of the cushion segments 242. Further, the barrier seam 252 intersects the boundary seam 250 at the front and rear ends of each cushion segment 242. Accordingly, the barrier seam 252 and the boundary seam 250 can cooperate to define the outer limits of each cushion segment 242, and can aid in isolating the cushion segments 242 from each other when the airbag 220 is deployed.

A distal end 238 of the valving panel 236 can define a plurality of valving regions 239. Each valving region 239 can be associated with a different cushion segment 242. In the illustrated embodiment, each valving region 239 is secured to the outboard panel 234 via a constricting seam 254, which may be a seam of any suitable variety. For example, in the illustrated embodiment, the constricting seams 254 are formed of box stitches, whereas in other embodiments, the constricting seams may be formed by adhesives. As can readily be seen in FIGS. 2B and 3C, each constricting seam 254 may extend along only a fraction of the full width (i.e., the dimension extending in the direction of the longitudinal length of the airbag 220) of each cushion segment 242. Accordingly, in the illustrated embodiment, portions of the valving region 239 that are on either side of the constricting seam 254 are unattached to the outboard panel 234. (See FIGS. 3A and 3C). Each valving region 239 can be said to define one or more one-way valves 241. Functioning of the one-way valves 241 is described further below with respect to FIGS. 4A-5C.

A proximal side or surface of the valving panel 236 can define at least a portion of the inflation gas delivery channel 240. A distal side or surface of the valving panel 236 can define at least a portion of each cushion segment 242. In particular, the distal surface of the valving panel 236 can cooperate with the inboard panel 232 to define an inflatable pocket 260.

An illustrative method for forming the airbag 220 can include attaching the proximal end 237 of the valving panel 236 to the inboard panel 232 via the barrier seam 252, or via a plurality of such seams. The method can further include attaching the distal end 238 of the valving panel 236 to the outboard panel 234 via the plurality of constricting seams 254. The method can further comprise attaching the inboard panel 232 to the outboard panel 234 via the boundary seam 250, or via a plurality of such seams, which may take place after the barrier and constriction seams 252, 254 have been formed as described previously. Creation of the boundary seam or seams 250 can further serve to capture portions of the valving panel 236 between the inboard and outboard panels 232, 234 and can thus further attach the valving panel 236 to both the inboard and outboard panels 232, 234 via the boundary seam 250.

Figure 4A:
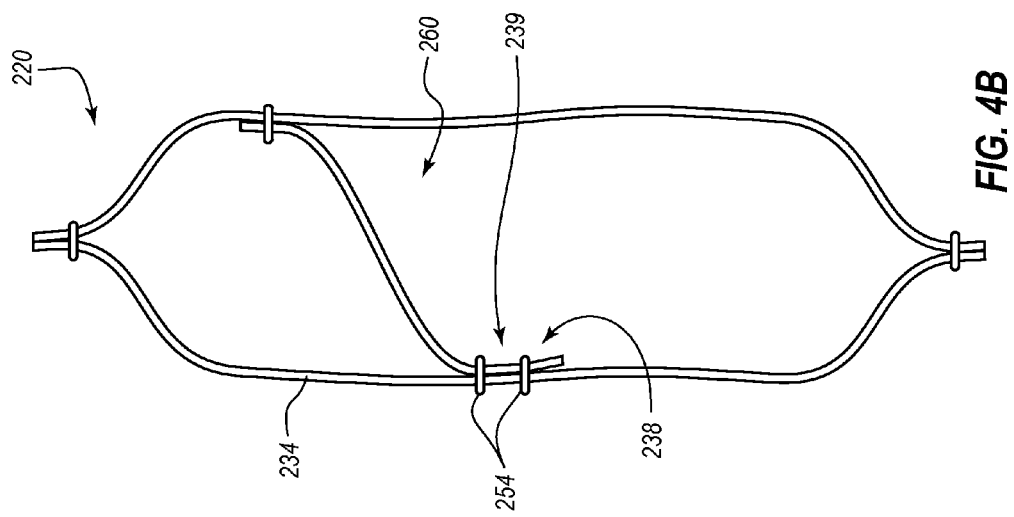
FIG. 4A is a cross-sectional view of the airbag of FIGS. 2A and 2B taken along the view line 3A-3A in FIGS. 2A and 2B, wherein the airbag is in an inflating and open state.
Figure 4B:
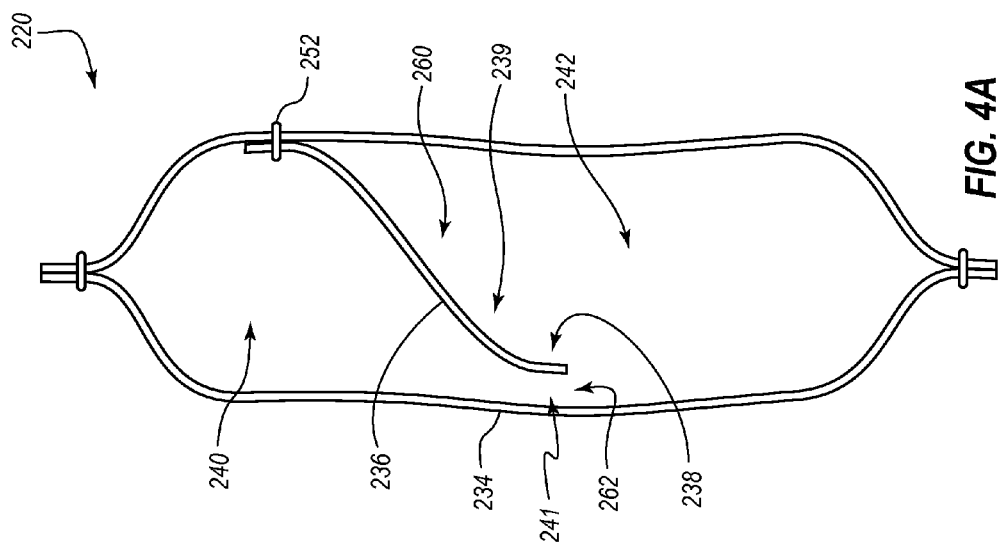
FIG. 4B is a cross-sectional view of the airbag of FIGS. 2A and 2B taken along the view line 3B-3B in FIGS. 2A and 2B, wherein the airbag is in an inflating and open state.
Figure 4C:
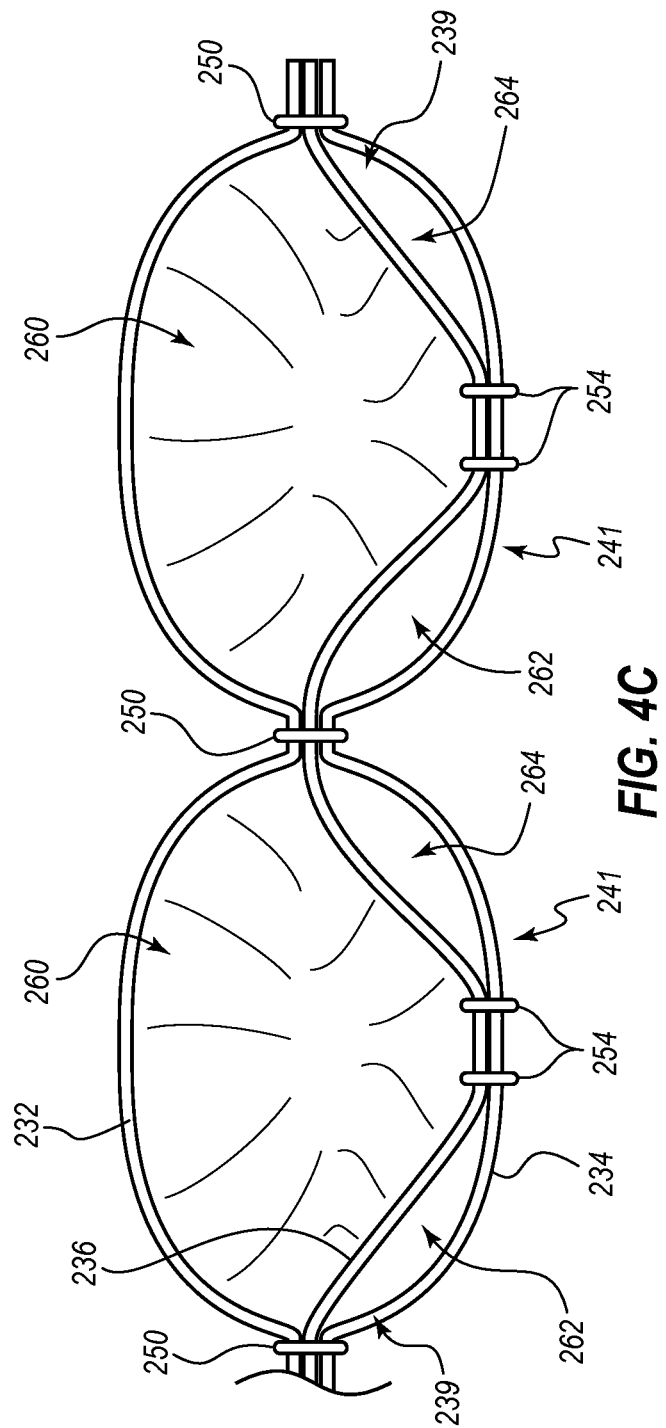
FIG. 4C is a cross-sectional view of the airbag of FIGS. 2A and 2B taken along the view line 3C-3C in FIGS. 2A and 2B, wherein the airbag is in an inflating and open state.

With reference to FIGS. 4A-4C, during inflation of the airbag 220, inflation gases enter the inflation gas delivery channel 240 from the inflator 118. The pressure inside the inflation gas delivery channel 240 is greater than the pressure inside the cushion segments 242. Accordingly, the one-way valves 241 are shown in an open state. Stated otherwise, each valving region 239 at the distal end 238 of the valving panel 236 is oriented so as to permit inflation gas to enter its respective cushion segment 242. In particular, a central or intermediate portion of the valving region 239 is secured to the outboard cushioning panel 234 via the constricting seam 254 and lateral edges of the valving region 239 are secured to both the inboard and outboard cushioning panels 232, 234 via the boundary seam 250. The remaining portions of the valving region 239 are unattached to the outboard cushioning panel 234, and thus are free to move relative thereto. Due to the pressure differential that exists between the inflation gas delivery channel 240 and the cushion segment 242—or stated otherwise, due to the pressure differential between the inflation gas delivery channel 240 and the inflatable pocket 260—each valving region 239 can cooperate with the outboard cushioning panel 234 to define a pair of valve apertures 262, 264 through which inflation gases can proceed into the cushion segment 242.

In the illustrated embodiment, each constricting seam 254 is located at a substantially central location, in the longitudinal direction, relative to the substantially vertically extending portions of the boundary seam 250 that define the sides of a cushion segment 242. As a result, the valve apertures 262, 264 may be approximately the same size. In other embodiments, a constricting seam 254 may be off-centered and the valve apertures 262, 264 may be different sizes. In still other embodiments, the constricting seam may be positioned only at one side of a cushion segment 242, such that only a single valve aperture 262 or 264 is formed. Constricting the size of the one or more valve apertures 262, 264 can allow the one-way valves 241 to operate as desired. For example, the small opening size can permit the one-way valves 241 to close rapidly when a desired pressure is reached within the cushion segment 242. In some instances, a substantially symmetrical arrangement such as that depicted in FIG. 4C can advantageously permit both apertures 262, 264 to operate substantially uniformly and in concert—e.g., both apertures 262, 264 may close at approximately the same pressure level and at approximately the same rate. In some embodiments, a dual-aperture arrangement that is provided by a single constricting seam 254, which may cover a relatively small region, can facilitate manufacture of the airbag 220.

Figure 5B:
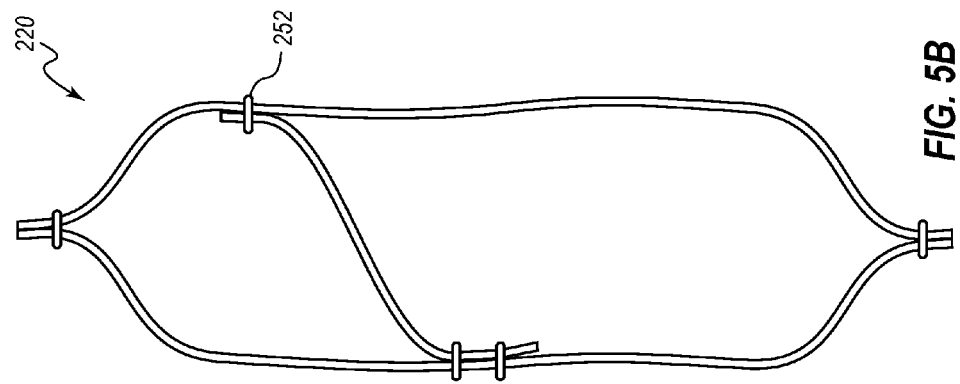
FIG. 5B is a cross-sectional view of the airbag of FIGS. 2A and 2B taken along the view line 3B-3B in FIGS. 2A and 2B, wherein the airbag is in an inflated and closed state.
Figure 5A:
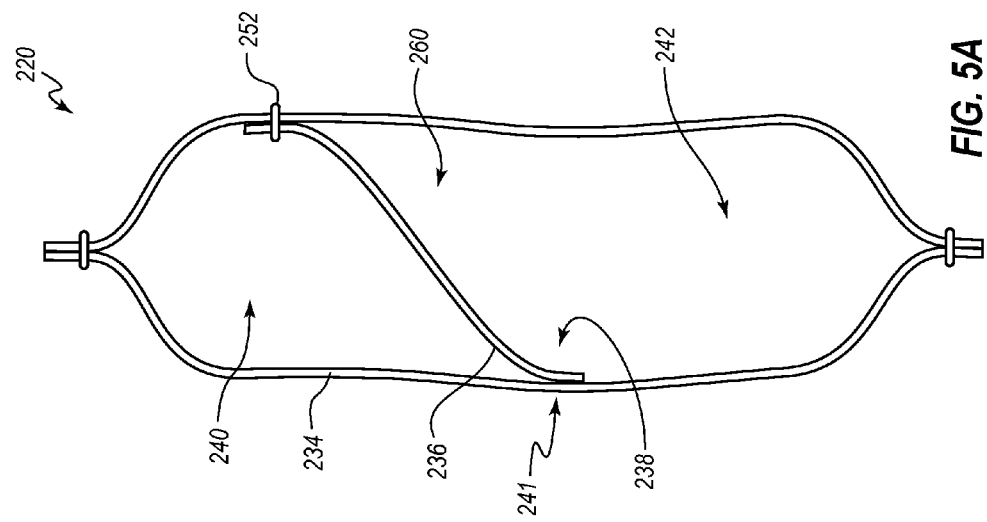
FIG. 5A is a cross-sectional view of the airbag of FIGS. 2A and 2B taken along the view line 3A-3A in FIGS. 2A and 2B, wherein the airbag is in an inflated and closed state.
Figure 5C:
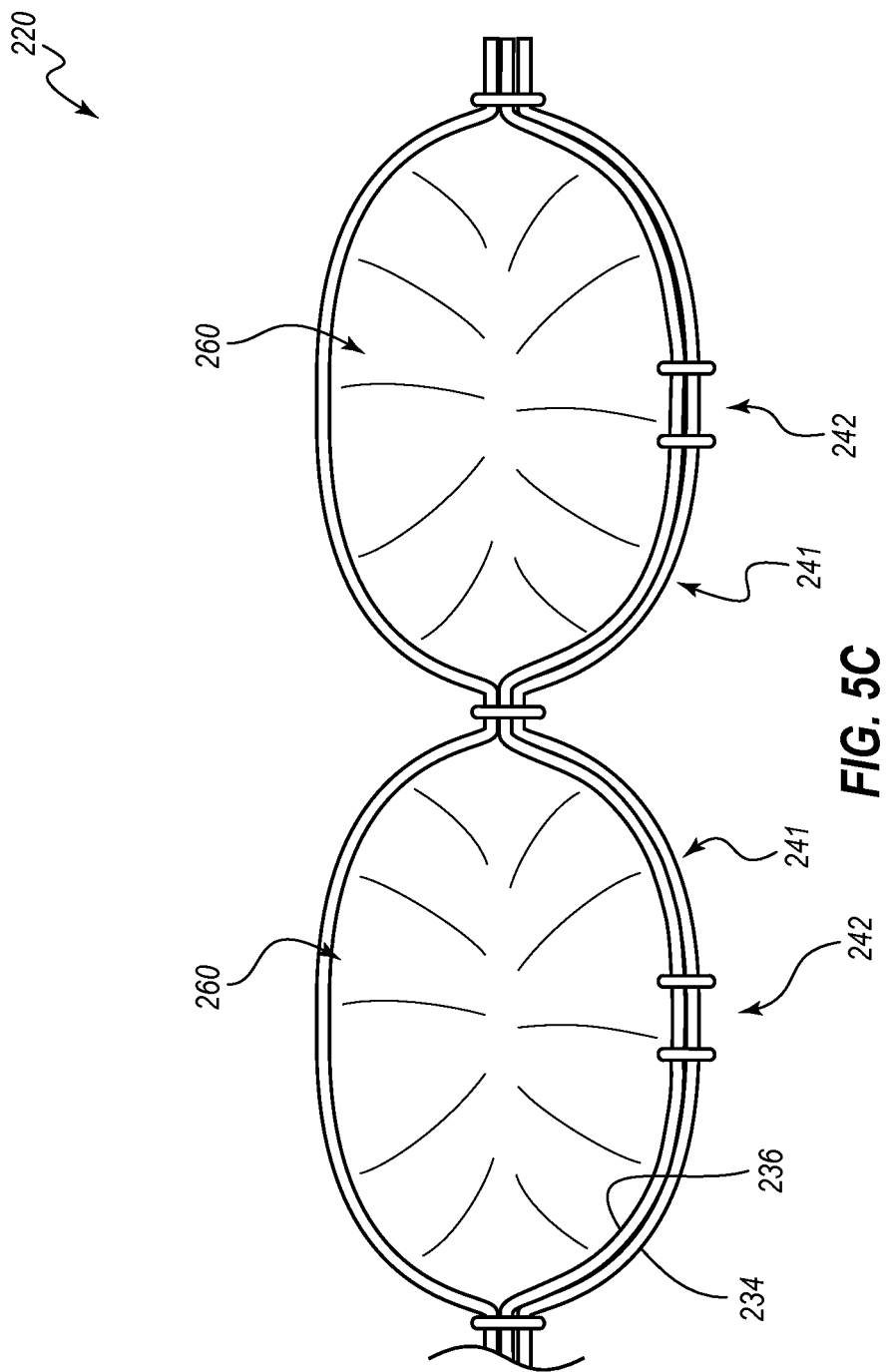
FIG. 5C is a cross-sectional view of the airbag of FIGS. 2A and 2B taken along the view line 3C-3C in FIGS. 2A and 2B, wherein the airbag is in an inflated and closed state.
Figure 6A:
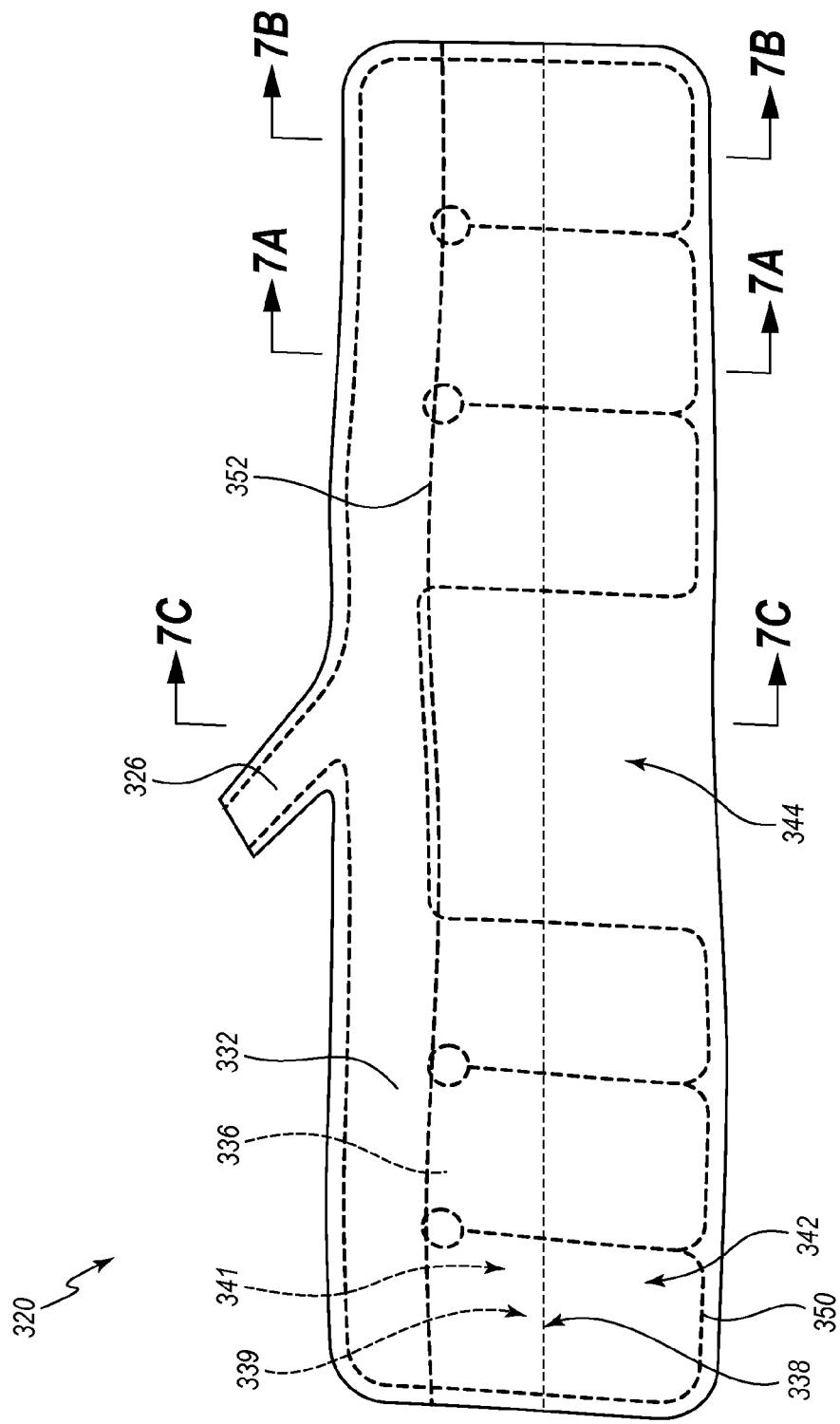
FIG. 6A is an inboard elevation view of another embodiment of an inflatable curtain airbag that is compatible with the inflatable curtain airbag assembly of FIGS. 1A and 1B.
Figure 6B:
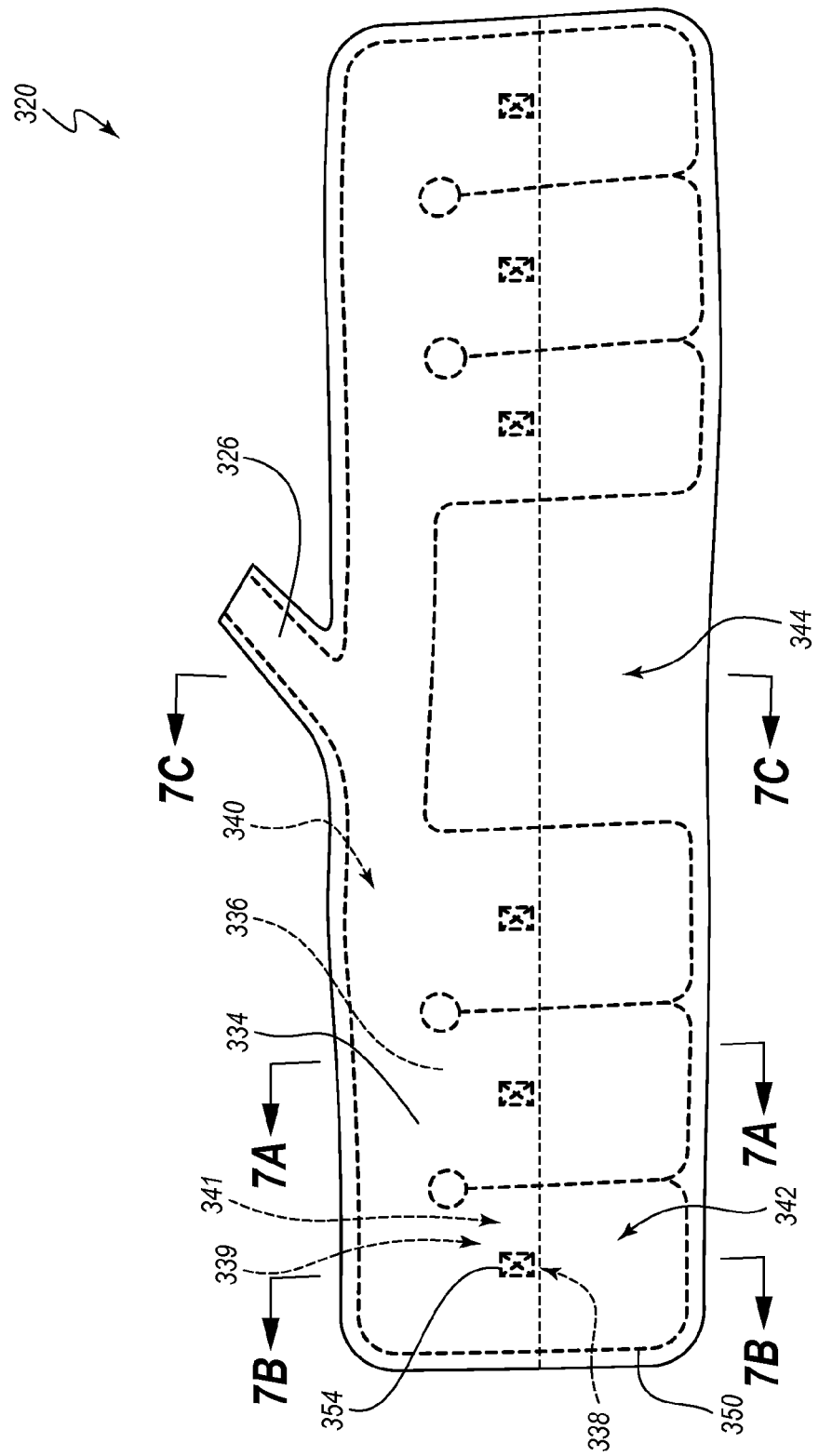
FIG. 6B is an outboard elevation view of the inflatable curtain airbag of FIG. 6A.

FIGS. 5A-5C illustrate a later stage of deployment of the airbag 220 at which the one-way valves 241 have been closed, thus isolating each cushion segment 242 from the inflation gas delivery channel 240 and from the remaining cushion segments 242. When the pressure within the cushion segment 242 (including the inflatable pocket 260) is sufficiently great, the distal end 238 of the valving panel 236 is pressed into sealing contact with the outboard panel 234 to prevent inflation gas from exiting from the cushion segment 242 through the one-way valve 241. Moreover, an increase in pressure within a given cushion segment 242 increases, such as due to compression of the cushion segment 242 by being squeezed between a vehicle occupant and a vehicle structure (e.g., a window or pillar), will serve to tighten the seal between the valving panel 236 and the outboard panel 234.

By segregating each cushion segment 242 from the remaining cushion segments 242, each cushion segment 242 has an independent volume of inflation gas, which volume is smaller than would be achieved if the cushion segments 242 were fluidly connected to each other. These independent volumes can allow the impact from a vehicle occupant to increase the pressure within the cushion segment 242 by a greater amount, such that the cushion segment 242 provides greater cushioning than it would otherwise. This can improve the ability of the curtain airbag 220 to prevent the head or other body part of the vehicle occupant from striking the vehicle interior through the airbag 220. In certain arrangements, having independent cushion segments 242 can allow the airbag 220 to be filled to a lower pressure than conventional curtain airbags, while still providing the same or better levels of protection. For example, even though the pressure within a given cushion segment 242 may initially be lower than in an airbag that has interconnected cushion segments 242, the pressure within a given cushion segment 242 will increase as the cushion segment 242 is compressed by contact with the vehicle occupant to thereby provide the desired cushioning effects (e.g., prevention of strikethrough), as opposed to a potential decrease in pressure that can occur in the interconnected arrangement due to the redistribution of inflation gases from the contacted cushion segment into other cushion segments 242. Stated otherwise, an "isolated-chamber" arrangement can result in an improvement in the energy absorption properties of a given cushion segment when the cushion segment is isolated, as compared with an arrangement in which multiple cushion segments are in fluid communication with each other. In certain of such "isolated-chamber" embodiments, a smaller inflator 118 can be used, which can reduce the overall cost and mass of the assembly 100. One or more of these advantages, as well as other advantages, are possible for the assembly 100 and the airbags 120, 220.

FIGS. 6A-7C depict another embodiment of an curtain airbag 320 such as the curtain airbags 120, 220 discussed above. Embodiments of the curtain airbag 320 are compatible with embodiments of the assembly 100 discussed above. Like the airbag 220, the airbag 320 can include a throat 326, an inflation gas delivery channel 340, multiple inflation cells or cushion segments 342, and a non-inflatable region 344. At least a portion of each cushion segment 342 can be defined by one or more boundary seams 350. Additionally, the airbag 320 can include an inboard panel 332, an outboard panel 334, and a valving panel 336, which can include valving regions 339. In the illustrated embodiment, the inboard panel 332 and the valving panel 336 are formed from a unitary piece of material that is folded over at a fold 370 at a proximal end of the airbag 320. The valving panel 336 can be shorter than the inboard panel 332 such that a distal end 338 of the valving panel 336 is at an intermediate region between the proximal and distal ends of the airbag 320. In some embodiments, a barrier seam 352 is provided to aid in isolating each cushion segment 342 from the remaining cushion segments 342. Constricting seams 354 can be provided at the distal end 338 of the venting panel 336 in a manner such as described above. FIGS. 7A and 7B resemble FIGS. 3A and 3B above, and one-way valves 341 can function in the same manner as the one-way valves 241 described above with respect to FIGS. 3A-5C.

FIG. 7C depicts a cross-sectional view through the non-inflatable region 344 and the throat 326, which is fluidly connected to the inflation gas delivery channel 340. In the illustrated embodiment, the barrier seam 352 extends longitudinally along a proximal end of the non-inflatable region 344. In some embodiments, the barrier seam 352 is positioned distally relative to an upper end of the boundary seam 350 in both the cushion segment 342 regions and the non-inflatable region 344, which can aid in isolating the cushion segments 342 from each other. In some embodiments, a portion of the valving panel 336 and a portion of the barrier seam 352 can be omitted from the non-inflatable region 344, which may reduce production costs and/or time.

Illustrative methods for forming the airbag cushion 320 can resemble the illustrative methods discussed above. However, in some methods, in order to position the valving panel 336 between the cushioning panels 332, 334, the fold 370 can be formed. The barrier seam 352 and the constricting seams 354 can then be formed. In some methods, the one or more boundary seams 350 can then be formed.

Figure 8:
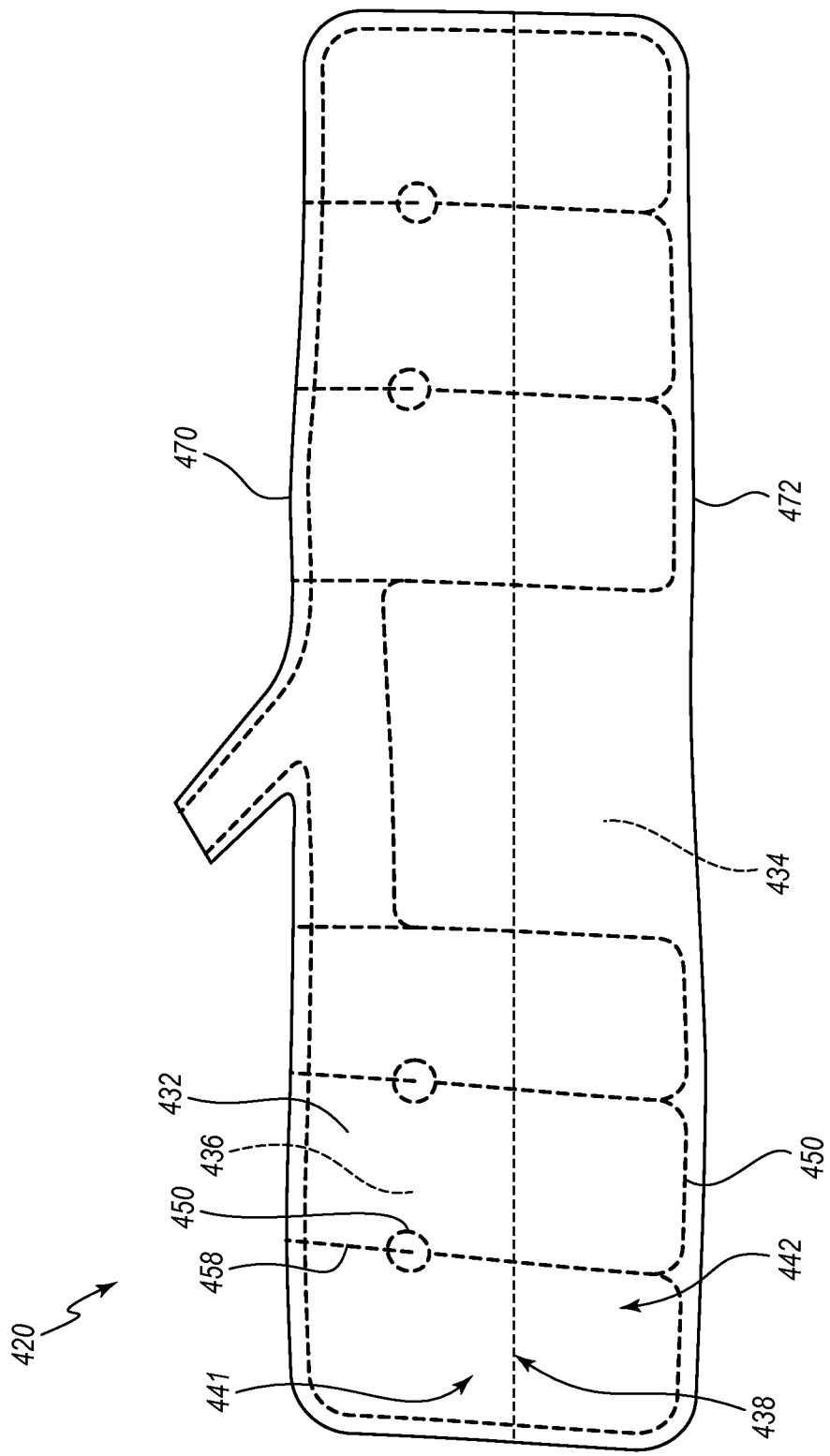
FIG. 8 is an inboard elevation view of another embodiment of an inflatable curtain airbag that is compatible with the inflatable curtain airbag assembly of FIGS. 1A and 1B.

FIG. 8 depicts another embodiment of an curtain airbag 420 such as the curtain airbags 120, 220, 320 discussed above. Embodiments of the curtain airbag 420 are compatible with embodiments of the assembly 100 discussed above. The airbag 420 can be formed of a single unitary piece of material. For example, the piece of material may include an outboard panel 434, an inboard panel 432, and a valving panel 436. A fold 472 at a distal end of the airbag 420 can demarcate the boundary between the outboard and inboard panels 434, 432, and another fold 470 at a proximal end of the airbag 420 can demarcate the boundary between the inboard and valving panels 432, 436.

The airbag 420 can include a plurality of individual, segregated, or isolated cushion segments 442. The distal boundaries of the cushion segments 442 can be defined by one of more boundary seams 450, which can extend through the inboard and outboard panels 432, 434 in some regions, and can extend through each of the inboard, outboard, and valving panels 436 in other regions. In order to fully isolate the cushion segments 442 from each other, additional barrier seams 458 can be formed. The barrier seams 458 may extend only through the inboard panel 432 and the valving panel 436, and do not extend through the outboard panel 434. FIG. 8 depicts an inboard elevation view of the curtain airbag 420. An outboard elevation view of the airbag 420 can be identical to the outboard view of the airbag 320 shown in FIG. 6B, reference to which indicates that the barrier seams 458 do not entrap any portion of the outboard panel 434. In the illustrated embodiment, the barrier seams 458 intersect the proximal ends of the boundary seams 450 and extend upwardly to a proximal edge of the airbag 420. Accordingly, in the illustrated embodiment, each cushion segment 442 extends from a proximal to a distal end of the airbag 420. The airbag 420 can include one-way valves 441 and can otherwise function like the airbags 120, 220, 320 discussed above.

In the embodiments illustrated in the drawings and discussed above, the cushion segments 142, 242, 342, 442 are fully isolated from each other when the one-way valves 141, 241, 341, 441 are closed. In other embodiments, it is possible to allow a small or restricted amount of fluid communication among two or more of the cushion segments, if such is desired. For example, the one-way valves 141, 241, 341, 441 can be configured to prevent fluid communication between the inflation gas delivery channels 140, 240, 340 and the cushion segments 142, 242, 342 when closed, but small passageways may be provided between sets of adjacent cushion segments 142, 242, 342 to allow transfer of a small amount of inflation gas among the cushion segments. The passageways may be defined, for example, by the inboard panel 132, 232, 332 and the valving panel 136, 236, 336. A proximal end of each passageway may be defined by the barrier seam 152, 252, 352 and a distal end of the passageways may be defined by the various proximal ends of the boundary seam 150, 250, 350. Stated otherwise, in certain of such embodiments, the barrier seam 152, 252, 352 may not intersect the boundary seam 150, 250, 350, and may instead be spaced from the boundary seam.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112(f). It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable curtain airbag assembly comprising:
an inflation gas delivery channel elongated in a longitudinal direction;
a plurality of inflatable cushion segments coupled to the inflation gas delivery channel, the cushion segments comprising an inside vehicle facing side and an outside vehicle facing side; and
a valving panel disposed within one or more of the plurality of the inflatable cushion segments between the inside vehicle facing side of the cushion segments and the outside vehicle facing side of the cushion segments, the valving panel elongated in the longitudinal direction and comprising:

a first end affixed to an affixed side, the affixed side selected from one of the inside vehicle facing side or the outside vehicle facing side, and a second end at least partially unaffixed to an unaffixed side of a cushion segment, the unaffixed side selected from one of the inside vehicle facing side or the outside vehicle facing side;

a valving channel formed between the second end of the valving panel and the unaffixed side of the cushion segment into at least one of the plurality of inflatable cushion segments, the second end of the valving panel that is at least partially unaffixed separating from the unaffixed side when the valving channel is in an open configuration, the second end of the valving panel that is at least partially unaffixed pressing against the unaffixed side when the valving channel is in a closed configuration;

wherein the valving panel is configured to transition the valving channel from the open configuration to the closed configuration, wherein the valving channel permits inflation gas to move from the inflation gas delivery channel into one of the plurality of inflatable cushion segments when the valving channel is in the open configuration, and wherein the valving channel prevents inflation gas from moving from said one of the inflatable cushion segments into the inflation gas delivery channel when the valving channel is in the closed configuration.

2. The inflatable curtain airbag assembly of claim 1, further comprising an inflatable curtain airbag and a restraint, wherein the inflatable curtain airbag comprises each of the inflation gas delivery channel, the plurality of inflatable cushion segments, and the valving panel, wherein the restraint extends about the inflatable curtain airbag to retain the inflatable curtain airbag in a packaged configuration prior to deployment of the inflatable curtain airbag, and wherein at least a portion of each of the inflation gas delivery channel and the valving panel of the inflatable curtain airbag are at an interior of the restraint when the inflatable curtain airbag is in the packaged configuration.

3. The inflatable curtain airbag assembly of claim 1, further comprising a first cushioning panel and a second cushioning panel that cooperate to define at least a portion of each of the plurality of inflatable cushion segments.

4. The inflatable curtain airbag assembly of claim 3, wherein each inflatable cushion segment is defined exclusively by the first cushioning panel, the second cushioning panel, the valving panel, and one or more seams connecting two or more of the first cushioning panel, the second cushioning panel, and the valving panel to each other.

5. The inflatable curtain airbag assembly of claim 3, wherein the valving panel is no stiffer than one or more of the first and second cushioning panels.

6. The inflatable curtain airbag assembly of claim 1, further comprising a first cushioning panel and a second cushioning panel that cooperate to define at least a portion of each of the plurality of inflatable cushion segments, and wherein the valving panel is attached to each of the first and second cushioning panels.

7. The inflatable curtain airbag assembly of claim 6, wherein the valving panel is attached to the first cushioning panel via a seam that extends in the longitudinal direction by a greater amount than does any one of the plurality of inflatable cushion segments.

8. The inflatable curtain airbag assembly of claim 7, wherein each valving channel formed by the valving panel is attached to the second cushioning panel via a constricting seam that extends in the longitudinal direction by a lesser amount than does the inflatable cushion segment with which the valving channel is associated.

9. The inflatable curtain airbag assembly of claim 1, further comprising a first cushioning panel and a second cushioning panel that cooperate to define at least a portion of each of the plurality of inflatable cushion segments, wherein the valving panel and the first cushioning panel are integrally formed from a unitary piece of material.

10. The inflatable curtain airbag assembly of claim 9, wherein a distal region of each valving region of the valving panel is attached to the second cushioning panel.

11. The inflatable curtain airbag assembly of claim 1, further comprising a first cushioning panel and a second cushioning panel that cooperate to define at least a portion of each of the plurality of inflatable cushion segments, wherein a proximal end of the inflatable curtain airbag assembly is configured to be attached to a vehicle and remain attached to the vehicle after deployment of the inflatable cushion segments, wherein a proximal end of the valving panel is attached to the first cushioning panel, and wherein each valving channel formed by the valving panel comprises a distal portion of the valving panel and transitions to the closed configuration by sealing against the second cushioning panel.

12. The inflatable curtain airbag assembly of claim 1, wherein the valving panel is coextensive with the inflation gas delivery channel in the longitudinal direction.

13. The inflatable curtain airbag assembly of claim 1, wherein each valving channel formed by the valving panel is configured to automatically transition from the open configuration to the closed configuration when a pressure within the inflatable cushion segment with which the valving channel is associated exceeds a pressure within the inflation gas delivery channel.

14. The inflatable curtain airbag assembly of claim 1, wherein transitioning a valving channel from the open configuration to the closed configuration fluidly isolates the inflatable cushion segment with which the valving channel is associated from the remaining inflatable cushion segments.

15. An inflatable curtain airbag comprising:
an inflation gas delivery channel;
a first cushioning panel;
a second cushioning panel coupled to the first cushioning panel, wherein the first and second cushioning panels cooperate to define at least a portion of inflatable cushion segments; and
a valving panel positioned between the first and second cushioning panels and attached to each of the first and second cushioning panels, wherein the valving panel forms valving channels with the first cushioning panel, and wherein each valving channel is associated with a separate inflatable cushion segment, a partially unaffixed portion of the valving panel separating from the first cushioning panel when in an open configuration, the partially unaffixed portion of the valving panel pressing against the first cushioning panel when in a closed configuration,
wherein each valving channel formed by the valving panel is configured to transition from an open configuration to a closed configuration,
wherein each valving channel by the partially unaffixed portion of the valving panel permits inflation gas to move from the inflation gas delivery channel into one of the plurality of inflatable cushion segments when the valving channel is in the open configuration, and wherein each valving channel formed by the partially unaffixed portion of the valving panel prevents inflation gas from moving from said one of the inflatable cushion segments into the inflation gas delivery channel when the valving channel is in the closed configuration.

16. The inflatable curtain airbag of claim 15, wherein the inflation gas delivery channel is positioned between the first and second cushioning panels.

17. The inflatable curtain airbag of claim 16, wherein the second cushioning panel defines at least a portion of the inflation gas delivery channel.

18. The inflatable curtain airbag of claim 15, wherein the valving panel cooperates with the second cushioning panel to define at least a portion of the inflation gas delivery channel, wherein each of the inflatable cushioning segments extends from the inflation gas delivery channel, and wherein transitioning a valving channel from the open configuration to the closed configuration fluidly isolates the inflatable cushion segment with which the valving channel is associated from the remaining inflatable cushion segments.

19. The inflatable curtain airbag of claim 15, wherein the valving panel is no stiffer than either of the first or second cushioning panels.

20. The inflatable curtain airbag of claim 15 wherein the valving panel is attached to the first cushioning panel via a seam that extends in the longitudinal direction by a greater amount than does any one of the plurality of inflatable cushion segments.

21. The inflatable curtain airbag of claim 15, wherein each valving channel of the valving panel is attached to the second cushioning panel via a constricting seam that extends in the longitudinal direction by a lesser amount than does the inflatable cushion segment with which the valving channel is associated.

22. The inflatable curtain airbag of claim 15, wherein:
each valving channel of the valving panel is attached to the second cushioning panel via a constricting seam;
each inflatable cushion segment is defined at least in part by boundary seams that are spaced from and are at opposite sides of the constricting seam associated with the inflatable cushion segment;
each valving channel cooperates with the second panel to define apertures through which inflation gas can move into the associated inflatable cushion segment when the valving channel is in the open configuration; and
the apertures are at opposite sides of the constricting seam associated with the valving channel.

23. The inflatable curtain airbag of claim 15, wherein the first cushioning panel and the valving panel are integrally formed from a unitary piece of material that is folded at a proximal end of the inflatable curtain airbag.

24. The inflatable curtain airbag of claim 23, wherein each valving region of the valving panel is attached to the second cushioning panel.

25. The inflatable curtain airbag of claim 15, wherein each inflatable cushion segment is in selective fluid communication with the inflation gas delivery channel via the valving panel, wherein a proximal valving end, a distal valving end, and opposing valving sides that extend between a proximal inflatable cushion segment end and a distal inflatable cushion segment end of each inflatable cushion segment are sealed via one or more seams, and wherein transitioning a valving channel of an inflatable cushion segment fluidly isolates the inflatable cushion segment from a remainder of the inflatable curtain airbag to retain inflation gas within the inflatable cushion segment.

26. A method of forming an inflatable curtain airbag, the method comprising:
positioning a valving panel between a first cushioning panel and a second cushioning panel;
attaching the first and second cushioning panels to each other to form at least a portion of each of a plurality of inflatable cushion segments; and
attaching the valving panel to the second cushioning panel to define at least a portion of an inflation gas delivery channel that is coupled with each of the plurality of inflatable cushion segments, wherein the valving panel includes a valving channel associated with each of the plurality of inflatable cushion segments that is configured to selectively permit fluid communication between the inflatable cushion segment and the inflation gas delivery channel, a partially unaffixed portion of the valving panel separating from the first cushioning panel when in an open configuration to form an open valving channel, the partially unaffixed portion of the valving panel pressing against the first cushioning panel when in a closed configuration to form a closed valving channel.

27. The method of claim 26, further comprising attaching the valving panel to the first cushioning panel, wherein attaching the valving panel to the first cushioning panel comprises forming a barrier seam and wherein attaching the valving panel to the second cushioning panel comprises forming a plurality of constricting seams that attach each valving channel of the valving panel to the second cushioning panel.

28. The method of claim 26, further comprising attaching the valving panel to the first cushioning panel, wherein attaching the valving panel to the first and second cushioning panels comprises seaming the valving panel between the first and second cushioning panels.

29. The method of claim 26, wherein the valving panel and the first cushioning panel are formed from a unitary piece of material, the method further comprising folding the unitary piece of material prior to positioning the valving panel between the first and second cushioning panels.

* * * * *